United States Patent
Shin et al.

(10) Patent No.: US 8,194,199 B2
(45) Date of Patent: Jun. 5, 2012

(54) LIQUID CRYSTAL DISPLAY DEVICE HAVING A RATIO OF LIQUID CRYSTAL CAPACITANCES EQUAL TO A RATIO OF PARASITIC CAPACITANCES

(75) Inventors: Kyoung-Ju Shin, Gyeonggi-do (KR); Chang-Hun Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 358 days.

(21) Appl. No.: 11/292,682

(22) Filed: Dec. 2, 2005

(65) Prior Publication Data

US 2006/0119756 A1   Jun. 8, 2006

(30) Foreign Application Priority Data

Dec. 2, 2004   (KR) .................. 10-2004-0100254

(51) Int. Cl.
G02F 1/136   (2006.01)
G02F 1/1343   (2006.01)

(52) U.S. Cl. ............................. 349/48; 349/38

(58) Field of Classification Search .................. 349/38, 349/48, 110, 111, 114, 129
See application file for complete search history.

(56) References Cited

U.S. PATENT DOCUMENTS

| | | | |
|---|---|---|---|
| 6,057,896 A | 5/2000 | Rho et al. | |
| 6,104,450 A | 8/2000 | Hiraishi | |
| 6,812,986 B2 * | 11/2004 | Takatori et al. | 349/141 |
| 7,227,606 B2 * | 6/2007 | Takeda et al. | 349/139 |
| 7,286,192 B2 * | 10/2007 | Lin et al. | 349/41 |
| 2001/0010567 A1 * | 8/2001 | Rho et al. | 349/43 |
| 2002/0196208 A1 * | 12/2002 | Nanno et al. | 345/55 |
| 2003/0112383 A1 * | 6/2003 | Kim | 349/43 |
| 2004/0004685 A1 * | 1/2004 | Luo | 349/113 |
| 2004/0233343 A1 * | 11/2004 | Baek | 349/38 |
| 2005/0068477 A1 * | 3/2005 | Shin et al. | 349/106 |
| 2005/0110924 A1 * | 5/2005 | Kim et al. | 349/111 |

FOREIGN PATENT DOCUMENTS

| | | | |
|---|---|---|---|
| JP | 7-072509 | | 3/1995 |
| JP | 07072509 A | * | 3/1995 |
| JP | 07-098462 A | | 4/1995 |
| JP | 07-146489 | | 6/1995 |

(Continued)

OTHER PUBLICATIONS

English Abstract, Publication No. JP 7-152013, Jun. 16, 1995.
English Abstract, Publication No. JP 7-072509, Mar. 17, 1995.
English Abstract, Publication No. KR 10-2003-0065817, Aug. 9, 2003.

(Continued)

*Primary Examiner* — Jessica M Merlin

(74) *Attorney, Agent, or Firm* — Innovation Counsel LLP

(57) ABSTRACT

A pixel includes a first subpixel and a second subpixel. The first subpixel includes a first switching element connected to a first gate line and a data line, a first liquid crystal capacitor connected to the first switching element, and a first storage capacitor connected to the first switching element. The second subpixel includes a second switching element connected to a second gate line and the data line, a second liquid crystal capacitor connected to the second switching element, and a second storage capacitor connected to the second switching element. At least one of a ratio of capacitances between a first parasitic capacitor formed in the first switching element and a second parasitic capacitor formed in the second switching element and a ratio of capacitances between the first storage capacitor and a second storage capacitor is determined based on a ratio of the first liquid crystal capacitor and the second liquid crystal capacitor.

18 Claims, 8 Drawing Sheets

FOREIGN PATENT DOCUMENTS

| | | |
|---|---|---|
| JP | 7-152013 | 6/1995 |
| JP | 08-146465 | 6/1996 |
| JP | 10-197894 | 7/1998 |
| JP | 11-174490 | 7/1999 |
| JP | 2000-019559 | 1/2000 |
| JP | 2000-155317 A | 6/2000 |
| JP | 2003-186451 | 7/2003 |
| JP | 2004-062146 | 2/2004 |
| KR | 10-1998-041817 A | 8/1998 |
| KR | 10-2003-0042221 A | 5/2003 |
| KR | 10-2003-0065817 | 8/2003 |
| KR | 10-2004-0001687 A | 1/2004 |
| KR | 10-2004-0002600 | 1/2004 |
| KR | 10-2004-0062752 | 7/2004 |

OTHER PUBLICATIONS

English Abstract, Publication No. KR 10-2004-0062752, Jul. 9, 2004.
English Abstract, Publication No. KR 10-2004-0002600, Jan. 7, 2004.
English Abstract, Publication No. JP 11-174490, Jul. 2, 1999.
English Abstract, Publication No. JP 10-197894, Jul. 31, 1998.
English Abstract, Publication No. JP 2004-062146, Feb. 26, 2004.
English Abstract, Publication No. JP 2003-186451, Jul. 4, 2003.
English Abstract, Publication No. JP 2000-019559, Jan. 21, 2000.
English Abstract, Publication No. JP-08-146465, Jun. 7, 1996.
English Abstract, Publication No. JP 07-146489, Jun. 6, 1995.

\* cited by examiner

LIQUID CRYSTAL DISPLAY DEVICE HAVING A RATIO OF LIQUID CRYSTAL CAPACITANCES EQUAL TO A RATIO OF PARASITIC CAPACITANCES

BACKGROUND OF THE INVENTION (a) Field of the Invention

The present invention relates to a display device and a driving method thereof, and in particular, to a liquid crystal display.

(b) Description of Related Art

Generally, a liquid crystal display (LCD) includes a pair of panels including a plurality of pixel electrodes and a common electrode and a liquid crystal (LC) layer interposed between the panels and having dielectric anisotropy. The pixel electrodes are arranged in a matrix and connected to switching elements such as thin film transistors (TFTs). The pixel electrodes are supplied with data voltages through the TFTs row by row. The common electrode ranges over an entire surface of a panel and is supplied with a common electrode. The pixel electrode and the common electrode along with the LC layer disposed therebetween form LC capacitors in circuital view, and a LC capacitor as well as a switching element is a basic element forming a pixel.

The LCD generates electric field in the LC layer by applying voltages to the electrodes, and obtains desired images by controlling the strength of the electric field to varying the transmittance of light incident on the LC layer.

Among the LCDs, a vertical alignment (VA) mode LCD, which aligns LC molecules such that the long axes of the LC molecules are perpendicular to the panels in absence of electric field, is spotlighted because of its high contrast ratio and wide reference viewing angle.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the reference viewing angle is widened.

However, the VA mode LCD has poor lateral visibility as compared with front visibility. For example, a lateral gamma curve is different from a front gamma curve.

To improve the lateral visibility, a pixel is divided into two subpixels capacitively coupled to each other. One of the two subpixels is directly supplied with a voltage, while the other is subjected to voltage drop by the capacitive coupling such that the two subpixels have different voltages to cause different transmittances.

However, the conventional method may not control the transmittances of the two subpixels. In particular, since the transmittance is varied depending on the color of light, it is preferred that the voltages for different colors are different, but it may not be possible. Furthermore, the aperture ratio is reduced due to the addition of conductors for capacitive coupling, and the transmittance is reduced due to the voltage drop caused by the capacitive coupling.

SUMMARY OF THE INVENTION

A liquid crystal display according to an embodiment of the present invention includes: a pixel including a first subpixel and a second subpixel; a first gate line coupled to the first subpixel and transmitting a first gate signal; a second gate line coupled to the second subpixel and transmitting a second gate signal; and a data line intersecting the first and the second gate lines and transmitting a data voltage, wherein the first subpixel includes a first switching element connected to the first gate line and the data line, a first liquid crystal capacitor connected to the first switching element, and a first storage capacitor connected to the first switching element, the second subpixel includes a second switching element connected to the second gate line and the data line, a second liquid crystal capacitor connected to the second switching element, and a second storage capacitor connected to the second switching element, and at least one of a ratio of capacitances between a first parasitic capacitor formed in the first switching element and a second parasitic capacitor formed in the second switching element and a ratio of capacitances between the first storage capacitor and a second storage capacitor is determined based on a ratio of the first liquid crystal capacitor and the second liquid crystal capacitor.

Each of the first and the second switching elements may include a thin film transistor including a gate electrode connected to the first or the second gate line, a source electrode connected to the data line, and a drain electrode connected to the first or the second liquid crystal capacitor and the first or the second storage capacitor, and the first and the second parasitic capacitances are formed between the gate electrodes and the drain electrodes.

The capacitances of the first and the second parasitic capacitances may depend on a channel width or a channel length of the transistors.

Sizes of the first and the second switching elements may be determined based on the ratio of the first liquid crystal capacitor and the second liquid crystal capacitor.

The ratio of the capacitances between the first and the second parasitic capacitors and the ratio of capacitances between the first storage capacitor and a second storage capacitor may be equal to the ratio of the first liquid crystal capacitor and the second liquid crystal capacitor.

The liquid crystal display may further include a storage electrode line connected to the first and the second storage capacitors.

The liquid crystal display may further include a shielding electrode overlapping the data line and electrically insulated from the data line.

The first liquid crystal capacitor may include a first subpixel electrode, and the second liquid crystal capacitor comprises a second subpixel electrode.

The first and the second subpixel electrodes may substantially have an inversion symmetry with respect to a straight line parallel to the first and the second gate lines.

At least one of the first and the second subpixel electrodes may have a cutout.

The liquid crystal display may further include a common electrode facing the first and the second pixel electrodes.

The common electrode may have a cutout.

The cutout of the at least one of the first and the second subpixel electrodes and the cutout of the common electrode may be alternately arranged.

A gap between the first subpixel electrode and the second subpixel electrode and the cutout of the common electrode may be alternately arranged.

The cutout of the common electrode may have a notch.

The liquid crystal display may further include a shielding electrode overlapping the data line and disposed on the same layer as the first and the second subpixel electrodes.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
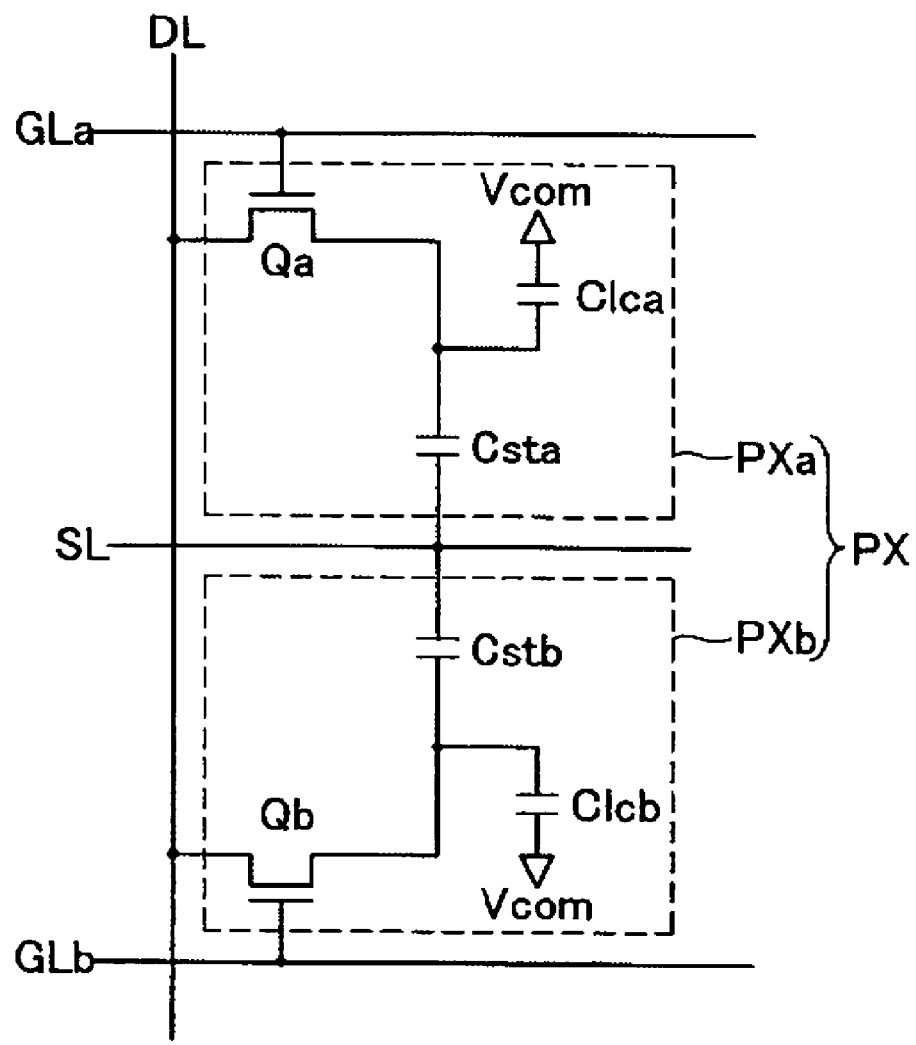
FIG. 1 is an equivalent circuit diagram of a pixel of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

An LCD according to an embodiment of the present invention will be described in detail with reference to FIGS. 1 and 2.

Figure 2:
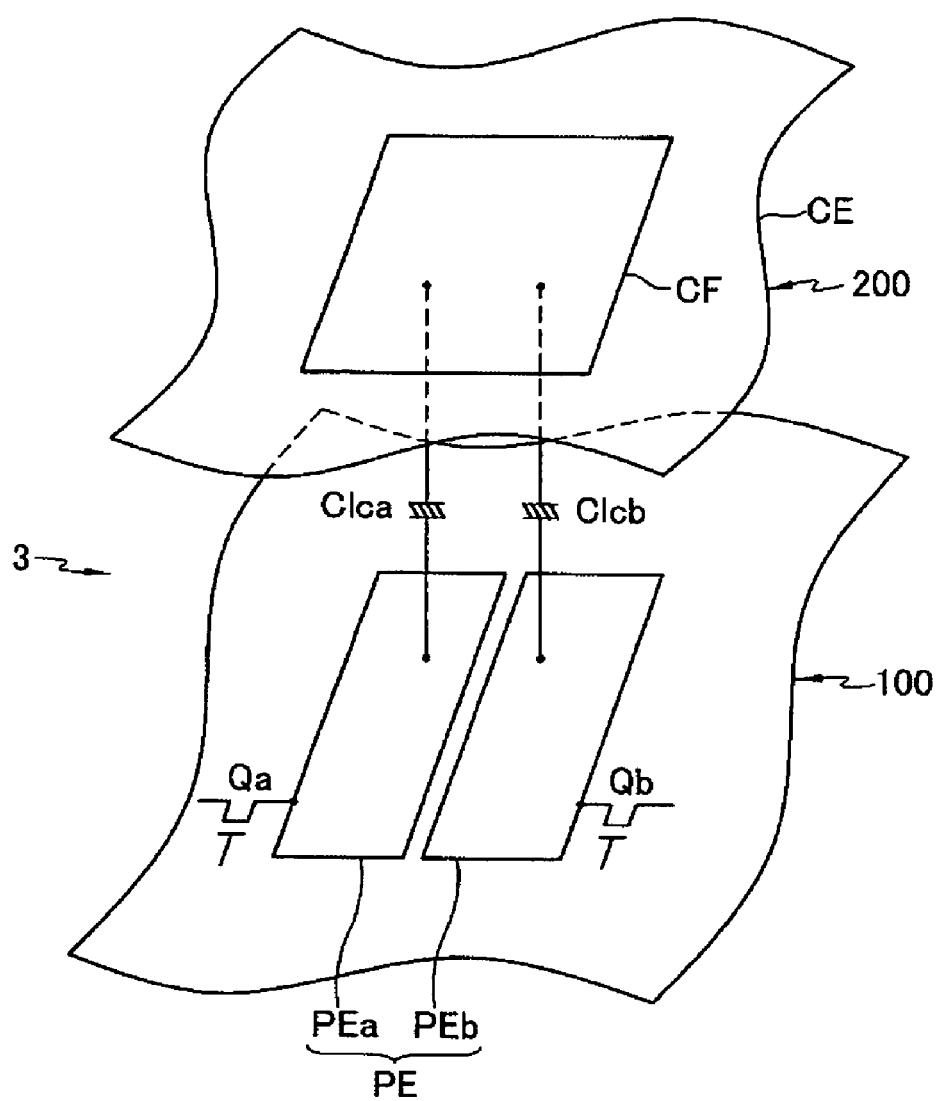
FIG. 2 is an equivalent circuit diagram of a subpixel of an LCD according to an embodiment of the present invention.

FIG. 1 is an equivalent circuit diagram of a pixel of an LCD according to an embodiment of the present invention, and FIG. 2 is an equivalent circuit diagram of a subpixel of an LCD according to an embodiment of the present invention.

In a circuit view, an LCD according to an embodiment includes a plurality of signal lines (not shown) and a plurality of pixels PX connected thereto and arranged substantially in a matrix. In a structural view, the panel assembly 300 includes a lower panel 100, an upper panel 200, and a LC layer 3 interposed therebetween.

The signal lines include a plurality of gate lines GLa and GLb transmitting gate signals (also referred to as "scanning signals"), and a plurality of data lines DL transmitting data signals. The gate lines GLa and GLb extend substantially in a row direction and substantially parallel to each other, while the data lines DL extend substantially in a column direction and substantially parallel to each other.

In addition, the signal lines further includes a plurality of storage electrode lines SL extending parallel to the gate lines GLa and GLb.

Referring to FIG. 1, each pixel PX includes a pair of subpixels PXa and PXb. Each subpixel PXa/PXb includes a liquid crystal (LC) capacitor Clca/Clcb and a switching element Qa/Qb connected to a gate line GLa/GLb, a data line DL, a LC capacitor Clca/Clcb, and a storage capacitor Csta/Cstb. The storage capacitors Csta and Cstb may be omitted, and in this case, the storage electrode lines SL may also be omitted.

The switching element Qa/Qb including a thin film transistor (TFT) is provided on the lower panel 100 and has three terminals: a control terminal connected to the gate line GLa/GLb; an input terminal connected to the data line DL; and an output terminal connected to both the LC capacitor Clca/Clcb and the storage capacitor Csta/Cstb.

The LC capacitor Clca/Clcb includes a subpixel electrode PEa/PEb and a common electrode CE provided on an upper panel 200 as two terminals. The LC layer 3 disposed between the electrodes PEa/PEb and CE functions as dielectric of the LC capacitor Clca/Clcb. A pair of subpixel electrodes PEa and PEb are separated from each other and form a pixel electrode PE. The common electrode CE is supplied with a common voltage Vcom and covers an entire surface of the upper panel 200. In other embodiments, the common electrode CE may be provided on the lower panel 100, and at least one of the electrodes PE and CE may have a shape of a bar or a stripe.

The storage capacitor Csta/Cstb is an auxiliary capacitor for the LC capacitor Clca/Clcb. The storage capacitor Csta/Cstb includes the subpixel electrode PEa/PEb and a separate signal line, which is provided on the lower panel 100, overlapping the subpixel electrode PEa/PEb via an insulator, and is supplied with a predetermined voltage such as the common voltage Vcom. Alternatively, the storage capacitor Csta/Cstb includes the subpixel electrode PEa/PEb and an adjacent gate line called a previous gate line, which overlaps the pixel electrode Csta/Cstb via an insulator.

For color display, each pixel PX uniquely represents one of primary colors (i.e., spatial division) or each pixel PX sequentially represents the primary colors in turn (i.e., temporal division) such that spatial or temporal sum of the primary colors are recognized as a desired color. An example of a set of the primary colors includes red, green, and blue colors. FIG. 2 shows an example of spatial division in that each pixel PX includes a color filter CF representing one of the primary colors in an area of the upper panel 200 facing the pixel electrode 190. Alternatively, the color filter CF is provided on or under the subpixel electrode PEa or PEb on the lower panel 100.

One or more polarizers (not shown) are attached to at least one of the panels 100 and 200.

Now, an LCD according to an embodiment of the present invention will be described in detail with reference to FIGS. 3, 4, 5, 6A and 6B.

Figure 3:
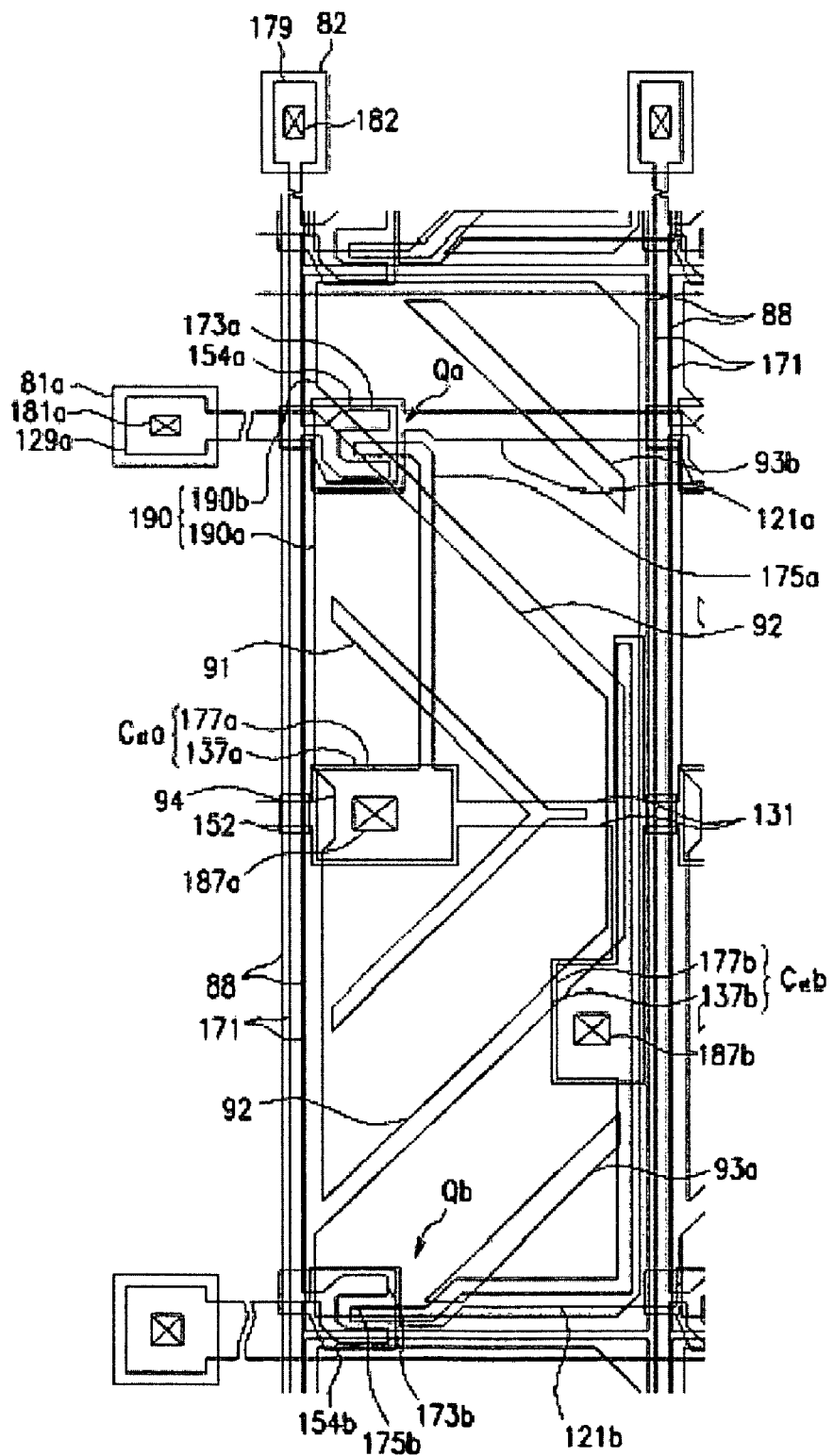
FIG. 3 is a layout view of a lower panel (TFT array panel) according to an embodiment of the present invention.
Figure 4:
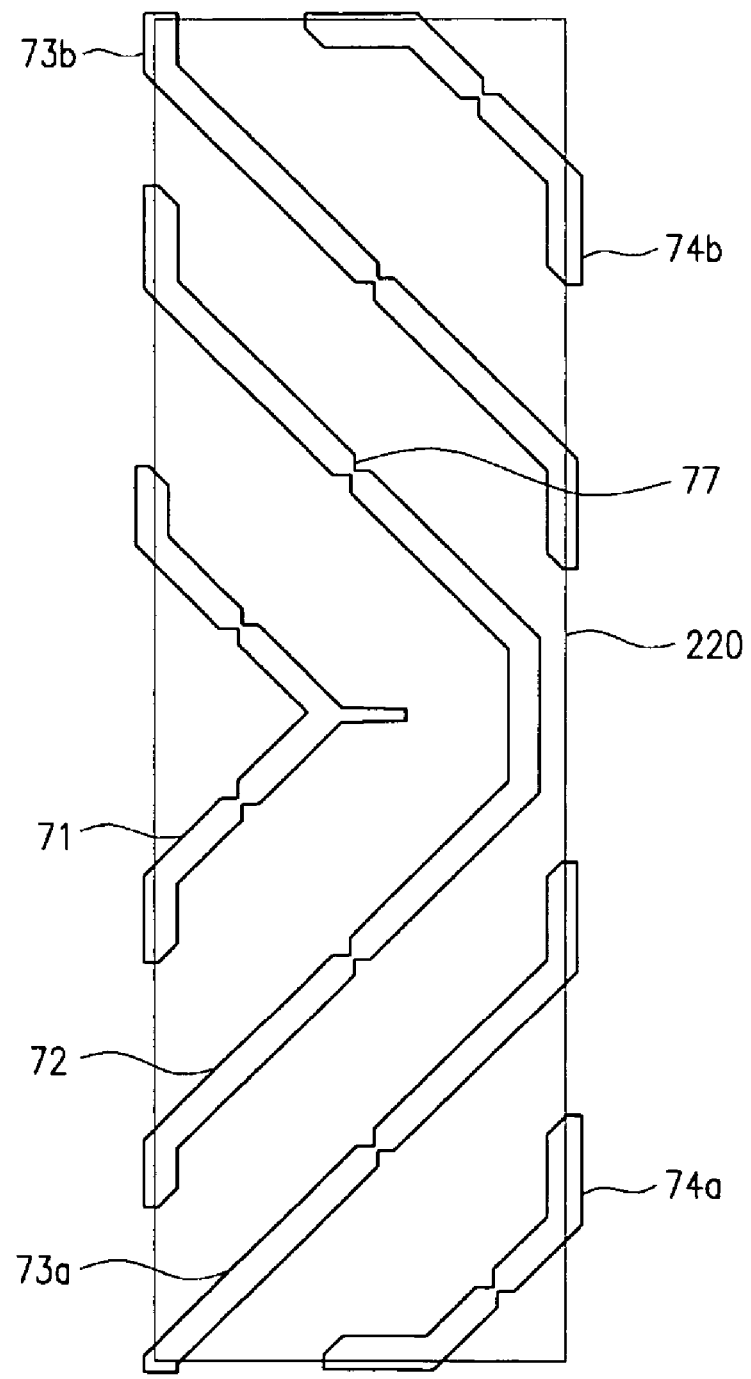
FIG. 4 is a layout view of an upper panel (common electrode panel) according to an embodiment of the present invention.
Figure 5:
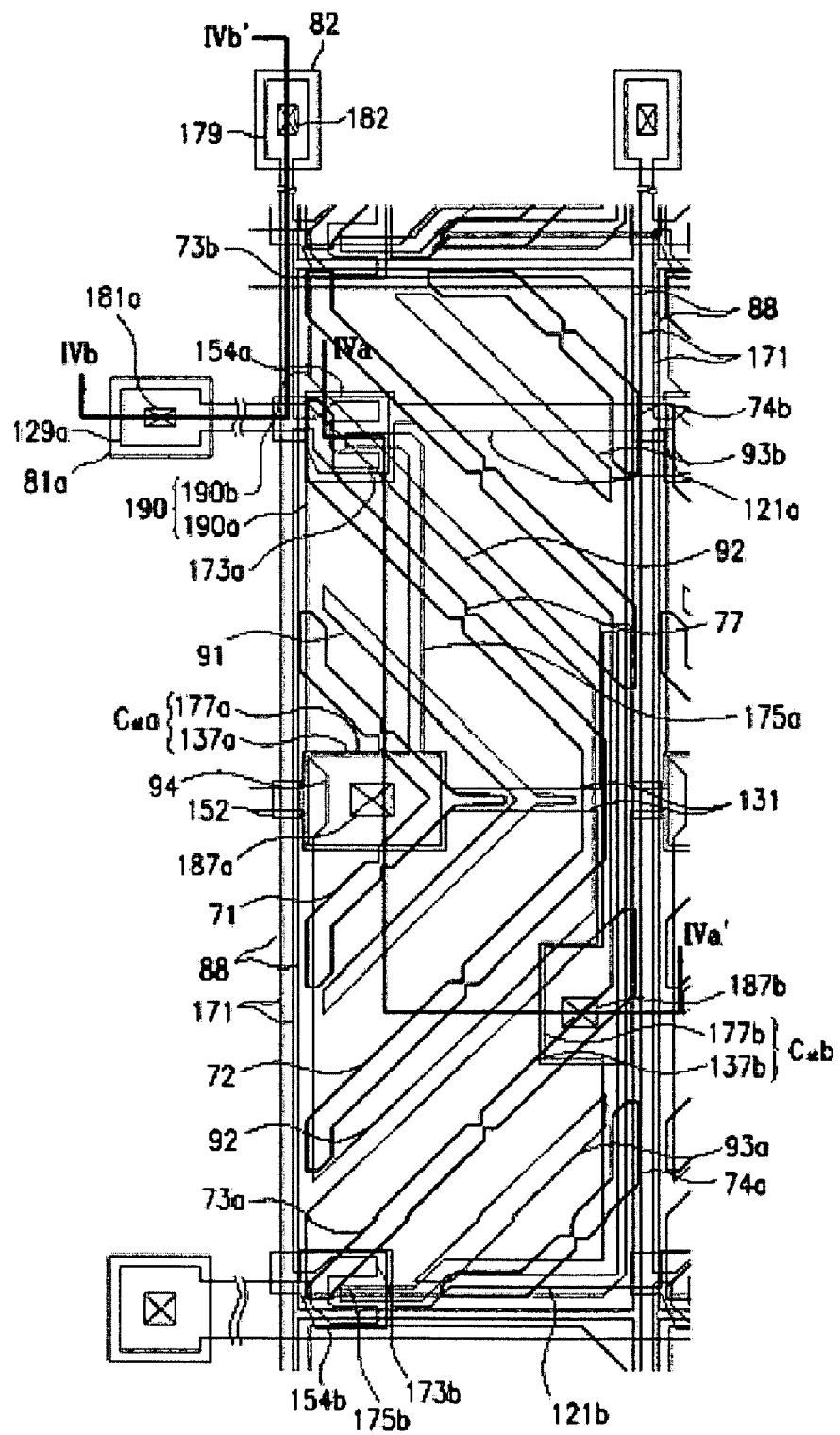
FIG. 5 is a layout view of an LC panel assembly including the TFT array panel shown in FIG. 3 and the common electrode panel shown in FIG. 4.
Figure 6A:
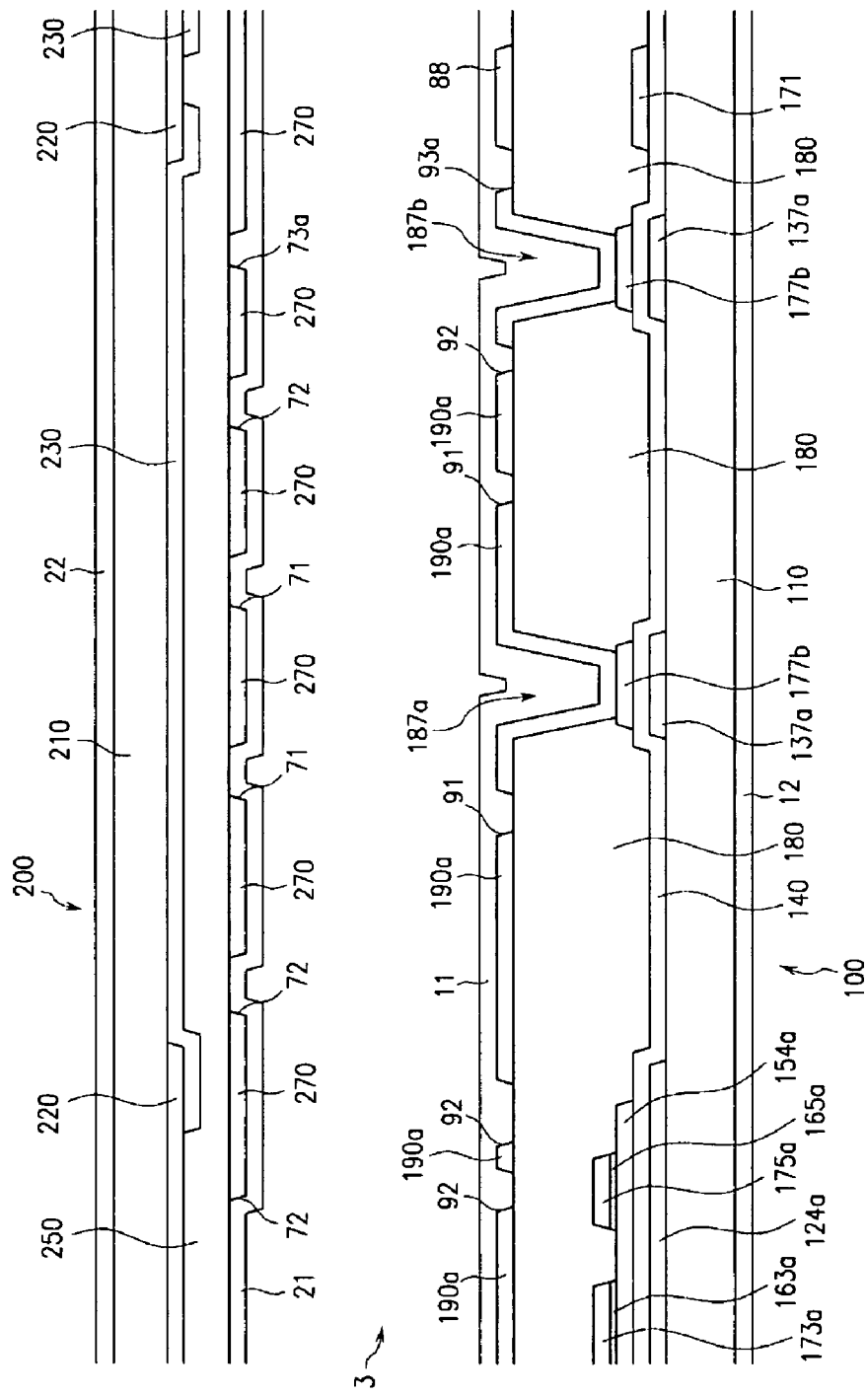
FIGS. 6A and 6B are sectional views of the LC panel assembly shown in FIG. 5 taken along lines VIA-VIA and VIB-VIB, respectively.
Figure 6B:
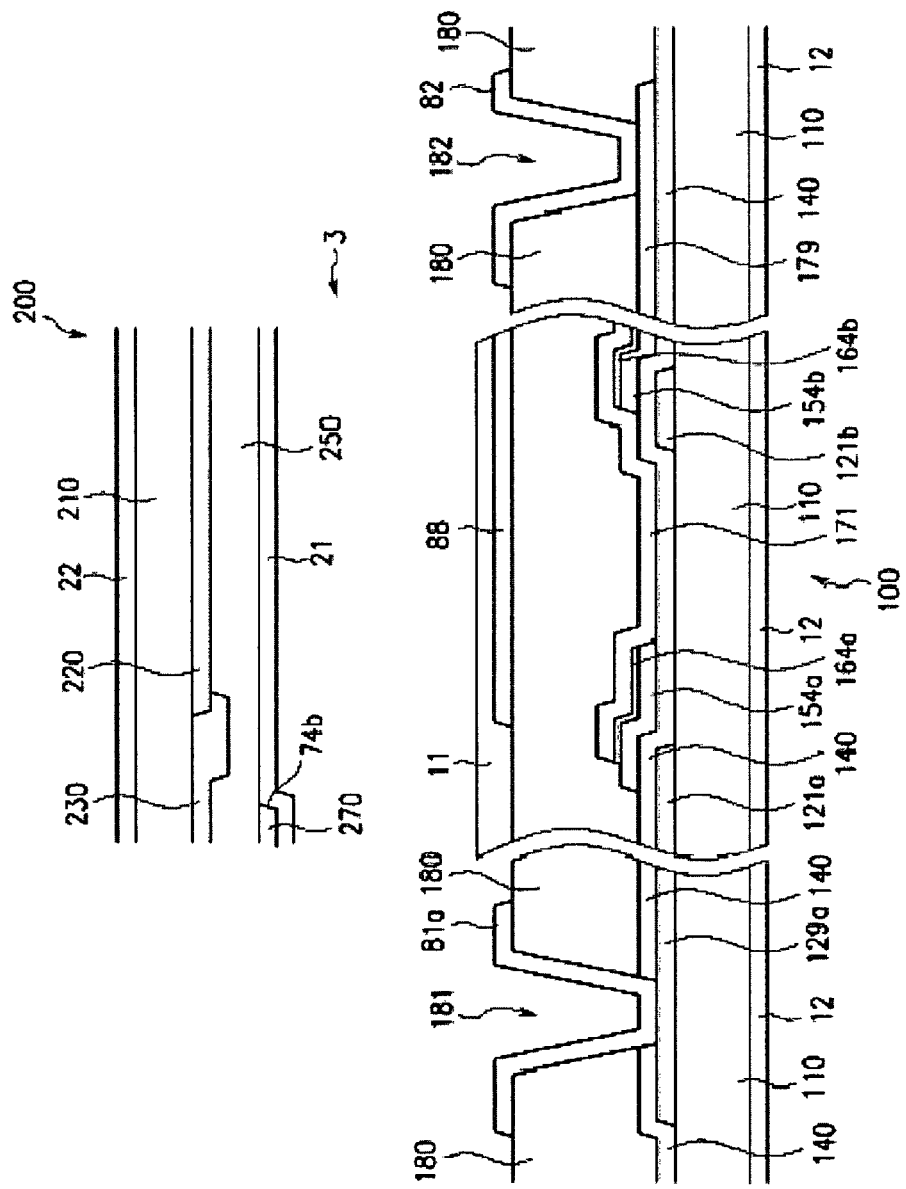

FIG. 3 is a layout view of a lower panel (TFT array panel) according to an embodiment of the present invention, FIG. 4 is a layout view of an upper panel (common electrode panel) according to an embodiment of the present invention, FIG. 5 is a layout view of an LC panel assembly including the TFT array panel shown in FIG. 3 and the common electrode panel shown in FIG. 4, and FIGS. 6A and 6B are sectional views of the LC panel assembly shown in FIG. 5 taken along lines VIA-VIA and VIB-VIB, respectively.

Referring to FIGS. 3-6B, an LCD according to an embodiment of the present invention includes a TFT array panel 100, a common electrode panel 200 facing the TFT array panel 100, and a liquid crystal layer 3 interposed between the panels 100 and 200.

First, the TFT array panel 100 will be described with reference to FIGS. 3, and 5-6B.

A plurality of pairs of first and second gate lines 121a and 121b and a plurality of storage electrode lines 131 are formed on an insulating substrate 110 such as transparent glass or plastic.

The gate lines 121a and 121b transmit gate signals, extend substantially in a transverse direction, and are physically and electrically separated from one another. The pair of first and second gate lines 121a and 121b are disposed at relatively upper and lower positions, respectively, and include a plurality of gate electrodes 124a and 124b projecting toward downward and upward. Each of the gate lines 121a and 121b further includes an end portion 129a and 129b having a large area for contact with another layer or a gate driving circuit. A gate driving circuit (not shown) for generating the gate signals may be mounted on a flexible printed circuit (FPC) film (not shown), which may be attached to the substrate 110, directly mounted on the substrate 110, or integrated onto the substrate 110. The gate lines 121a and 121b may extend to be connected to a driving circuit that may be integrated on the substrate 110.

The storage electrode lines 131 are supplied with a predetermined voltage such as the common voltage Vcom and each of the storage electrode lines 131 includes a stem extending substantially parallel to the gate lines 121a and 121b and a plurality of pairs of first and second storage electrodes 137a and 137b extending upward and downward from the stem. Each of the storage electrode lines 131 is disposed between first and second gate lines 121a and 121b and it is closer to the first gate line 121a than the second gate line 121b.

The second storage electrodes 137b are longer and narrower than the first storage electrodes 137a. The storage electrode lines 131 may have various shapes and arrangements.

The gate lines 121a and 121b and the storage electrode lines 131 are preferably made of Al containing metal such as Al and Al alloy, Ag containing metal such as Ag and Ag alloy, Cu containing metal such as Cu and Cu alloy, Mo containing metal such as Mo and Mo alloy, Cr, Ta, or Ti. However, they may have a multi-layered structure including two conductive films (not shown) having different physical characteristics. One of the two films is preferably made of low resistivity metal including Al containing metal, Ag containing metal, and Cu containing metal for reducing signal delay or voltage drop. The other film is preferably made of material such as Mo containing metal, Cr, Ta, or Ti, which has good physical, chemical, and electrical contact characteristics with other materials such as indium tin oxide (ITO) or indium zinc oxide (IZO). Good examples of the combination of the two films are a lower Cr film and an upper Al (alloy) film and a lower Al (alloy) film and an upper Mo (alloy) film. However, the gate lines 121a and 121b and the storage electrode lines 131 may be made of various metals or conductors.

The lateral sides of the gate lines 121a and 121b and the storage electrode lines 131 are inclined relative to a surface of the substrate, and the inclination angle thereof ranges about 30-80 degrees.

A gate insulating layer 140 preferably made of silicon nitride (SiNx) or silicon oxide (SiOx) is formed on the gate lines 121a and 121b and the storage electrode lines 131.

A plurality of semiconductor islands 152, 154a and 154b preferably made of hydrogenated amorphous silicon (abbreviated to "a-Si") or polysilicon are formed on the gate insulating layer 140. The semiconductor islands 154a and 154b are disposed on the first and the second gate electrodes 124a and 124b, respectively, and the semiconductor islands 152 are disposed on the storage electrode lines 131.

A plurality of pairs of ohmic contact islands 163a and 165a are formed on the semiconductor islands 154a and a plurality of pairs of ohmic contact islands (not shown) are formed on the semiconductor islands 154b. Furthermore, a plurality of ohmic contact islands (not shown) are disposed on the semiconductor islands 152. The ohmic contact stripes and islands 163a and 165a are preferably made of n+ hydrogenated a-Si heavily doped with n type impurity such as phosphorous or they may be made of silicide.

The lateral sides of the semiconductor stripes 152, 154a and 154b and the ohmic contacts 163a and 165a are inclined relative to the surface of the substrate 110, and the inclination angles thereof are preferably in a range of about 30-80 degrees.

A plurality of data lines 171 and a plurality of pairs of first and second drain electrodes 175a and 175b are formed on the ohmic contacts 163a and 165a and the gate insulating layer 140.

The data lines 171 transmit data signals and extend substantially in the longitudinal direction to intersect the gate lines 121a and 121b. Each data line 171 includes a plurality of first and second source electrodes 173a and 173b projecting toward the first and the second gate electrodes 124a and 124b, respectively, and curved like a character C. Each of the data lines 171 further includes an end portion 179 having a large area for contact with another layer or an external driving circuit. A data driving circuit (not shown) for generating the data signals may be mounted on a FPC film (not shown), which may be attached to the substrate 110, directly mounted on the substrate 110, or integrated onto the substrate 110. The data lines 171 may extend to be connected to a driving circuit that may be integrated on the substrate 110.

The first and the second drain electrodes 175a and 175b are separated from the data lines 171 and disposed opposite the first and the second source electrodes 173a and 173b with respect to the first and the second gate electrodes 124a and 124b. Each of the first and the second drain electrodes 175a and 175b includes a wide end portion 177a or 177b and a narrow end portion. The wide end portion 177a or 177b overlaps first or second storage electrode 137a or 137b and the narrow end portion is disposed on the first or the second projection 154a or 154b and partly enclosed by a first or the second source electrode 173a or 173b.

A gate electrode 124a/124b, a source electrode 173a/173b, and a drain electrode 175a/175b along with a semiconductor island 154a/154b form a TFT Qa and Qb having a channel formed in the semiconductor island 154a/154b disposed between the source electrode 173a/173b and the drain electrode 175a/175b.

The data lines 171 and the drain electrodes 175a and 175b are preferably made of refractory metal such as Cr, Mo, Ta, Ti, or alloys thereof. However, they may have a multilayered structure including a refractory metal film (not shown) and a low resistivity film (not shown). Good examples of the multi-layered structure are a double-layered structure including a lower Cr/Mo (alloy) film and an upper Al (alloy) film and a triple-layered structure of a lower Mo (alloy) film, an intermediate Al (alloy) film, and an upper Mo (alloy) film. However, the data lines 171 and the drain electrodes 175a and 175b may be made of various metals or conductors.

The data lines 171 and the drain electrodes 175a and 175b have inclined edge profiles, and the inclination angles thereof range about 30-80 degrees.

The ohmic contacts 163a and 165a are interposed only between the underlying semiconductor islands 152, 154a and 154b and the overlying conductors 171, 175a and 175b thereon and reduce the contact resistance therebetween. The semiconductor islands 152 and the overlying ohmic contacts smooth the profile of the surface to prevent the disconnection of the data lines 171. The semiconductor islands 152, 154a and 154b include some exposed portions, which are not covered with the data lines 171 and the drain electrodes 175a and 175b, such as portions located between the source electrodes 173 and the drain electrodes 175a and 175b.

A passivation layer 180 is formed on the data lines 171, the drain electrodes 175a and 175b, and the exposed portions of the semiconductor stripes 152, 154a and 154b. The passivation layer 180 is preferably made of inorganic or organic insulator and it may have a flat top surface. Examples of the inorganic insulator include silicon nitride and silicon oxide. The organic insulator may have photosensitivity and dielectric constant less than about 4.0. The passivation layer 180 may include a lower film of inorganic insulator and an upper film of organic insulator such that it takes the excellent insulating characteristics of the organic insulator while preventing the exposed portions of the semiconductor islands 152, 154a and 154b from being damaged by the organic insulator.

The passivation layer 180 has a plurality of contact holes 182, 187a and 187b exposing the end portions 179 of the data lines 171 and the drain electrodes 175a and 175b, respectively. The passivation layer 180 and the gate insulating layer 140 have a plurality of contact holes 181a and 181b exposing the end portions 129a and 129b of the gate lines 121a and 121b.

A plurality of pixel electrodes 190 including first and second subpixel electrodes 190a and 190b, a shielding electrode 88, and a plurality of contact assistants 81a, 81b and 82 are formed on the passivation layer 180. They are preferably made of transparent conductor such as ITO or IZO or reflective conductor such as Ag, Al, Cr, or alloys thereof.

The first/second subpixel electrode 190a/190b is physically and electrically connected to the first/second drain electrodes 175a/175b through the contact holes 185a/185b such that the subpixel electrode 190a/190b receives data voltages from the first/second drain electrodes 175a/175b.

The subpixel electrodes 190a and 190b supplied with the data voltages generate electric fields in cooperation with a common electrode 270 of the common electrode panel 270 supplied with a common voltage, which determine the orientations of liquid crystal molecules (not shown) of the liquid crystal layer 3 disposed between the two electrodes 190 and 270. A subpixel electrode 190a/190b and the common electrode 270 form a LC capacitor Clca/Clcb, which stores applied voltages after the TFT turns off. Storage capacitors Csta and Cstb for enhancing the charge storing capacity are formed by overlapping the first and the second subpixel electrodes 190a and 190b and the drain electrodes 175a and 175b with the first and the second storage electrodes 137a and 137b, etc.

Each pixel electrode 190 is chamfered at right corners and the chamfered edges of the pixel electrode 190 make an angle of about 45 degrees with the gate lines 121.

Each of the pixel electrodes 190 includes a pair of first and second subpixel electrodes 190a and 190b spaced apart from each other with interposing a gap 192, and has a shape of rectangle. The first subpixel electrode 190a is a rotated isosceles trapezoid and has a right edge disposed near a second storage electrode 137b, a left edge disposed opposite the left edge, and upper and lower oblique edges making an angle of about 45 degrees with the gate lines 121a and 121b. The second subpixel electrode 190b includes a pair of trapezoids facing the oblique edges of the first subpixel electrode 190a and a longitudinal portion facing the left edge of the first subpixel electrode 190a.

Accordingly, the gap 92 between the first subpixel electrode 190a and the second subpixel electrode 190b substantially have a uniform width, and includes upper and lower oblique portions making an angle of about 45 degrees with the gate lines 121a and 121b and a longitudinal portion substantially having a uniform width.

The first subpixel electrode 190a has center cutouts 91 and 94, and the second subpixel electrode 190b has a lower cutout 93a and an upper cutout 93b. The gap 92 is also referred to as a cutout hereinafter, and the cutouts 91, 92, 93a, 93b and 94 partition a plurality of partitions. The cutouts 91, 92, 93a, 93b and 94 have an inversion symmetry with respect to the storage electrode line 131.

Each of the lower and the upper cutouts 93a and 93b obliquely extends approximately from a right edge of the pixel electrode 190 approximately to an upper or a lower edge of the pixel electrode 190. The lower cutout 93a and the upper cutout 93b are disposed at lower and upper halves of the pixel electrode 190, respectively, which can be divided by the storage electrode line 131. The lower and the upper cutouts 93a and 93b make an angle of about 45 degrees to the gate lines 121, and they extend substantially perpendicular to each other.

The center cutout 91 includes a center portion extending in the transverse direction and a pair of oblique portions substantially parallel to the lower cutout 93a and the upper cutout 93b, respectively. The center cutout 94 is a depression disposed at the left edge of the pixel electrode 190 and has a pair of oblique portions substantially parallel to the lower cutout 93a and the upper cutout 93b, respectively.

Accordingly, the lower half of the pixel electrode 190 is partitioned into three partitions by the cutouts 91, 92 and 93a, and the upper half of the pixel electrode 190 is also partitioned into three upper partitions by the cutouts 91, 92 and 93b.

The number of the cutouts or the number of the partitions is varied depending on the design factors such as the size of the pixel electrode 190, the ratio of the transverse edges and the longitudinal edges of the pixel electrode 190, the type and characteristics of the liquid crystal layer 3, and so on.

In addition, the first subpixel electrode 190a overlaps a first gate line 121a and the second subpixel electrode 190b overlaps both of first and second gate lines 121a and 121b.

The shielding electrode 88 extends along the data lines 171 and the gate lines 121b and fully covers the data lines 171, but partially covers the gate lines 121b. The shielding electrode 88 is supplied with the common voltage that is applied through a contact hole provided at the passivation layer 180 and the gate insulating layer 140 or supplied from a short-circuit point (not shown) transmitting the common voltage from the TFT array panel 100 to the common electrode panel 200. At this time, it is preferable that the distance between the shielding electrode 88 and the pixel electrodes 190 is minimized to minimize the decrease of the aperture ratio.

The shielding electrode 88 blocks electromagnetic interference between the data lines 171 and the pixel electrodes 190 and between the data lines 171 and the common electrode 270 to reduce the distortion of the voltage of the pixel electrodes 190 and the signal delay of the data voltages carried by the data lines 171.

Furthermore, since the pixel electrodes 190 are required to be spaced apart from the shielding electrodes 88 for preventing the short therebetween, the pixel electrodes 190 become farther from the data lines 171 such that the parasitic capacitance therebetween becomes reduced. Moreover, since the permittivity of the LC layer 3 is higher than that of the passivation layer 180, the parasitic capacitance between the data lines 171 and the shielding electrodes 88 is reduced compared with that between the data lines 171 and the common electrode 270 without the shielding electrodes 88.

In addition, the distance between the pixel electrodes 190 and the shielding electrodes 88 can be uniformly maintained since they are made of the same layer and thus the parasitic capacitance therebetween can be made uniform.

The contact assistants 81a, 81b and 82 are connected to the end portions 129a and 129b of the gate lines 121a and 121b and the end portions 179 of the data lines 171 through the contact holes 181a, 181b and 182, respectively. The contact assistants 81a, 81b and 82 protect the end portions 129a, 129b and 179 and enhance the adhesion between the end portions 129, 129b and 179 and external devices.

When the data driver or the data driver is integrated on the panel assembly 300, the gate lines 121a and 121b or the data lines 171 may extend to be directly connected to the driver and the contact assistants 81a, 81b and 82 are used for connecting the gate lines 121a and 121b or the data lines 171 to the drivers.

The description of the common electrode panel 200 follows with reference to FIGS. 20-24.

A light blocking member 220 referred to as a black matrix for preventing light leakage is formed on an insulating substrate 210 such as transparent glass or plastic. The light blocking member 220 has a plurality of openings that face the pixel electrodes 190 and it may have substantially the same planar shape as the pixel electrodes 190. Otherwise, the light blocking member 220 may include a plurality of rectilinear portions facing the data lines 171 on the TFT array panel 100 and a plurality of widened portions facing the TFTs Qa and Qb on the TFT array panel 100. However, the light blocking member 220 may have various shapes for blocking light leakage near the pixel electrodes 190 and the TFTs Qa and Qb.

A plurality of color filters 230 are also formed on the substrate 210 and they are disposed substantially in the areas enclosed by the light blocking member 220. The color filters 230 may extend substantially in the longitudinal direction along the pixel electrodes 190. The color filters 230 may represent one of the primary colors such as red, green and blue colors.

An overcoat 250 is formed on the color filters 230 and the light blocking member 220. The overcoat 250 is preferably made of (organic) insulator and it prevents the color filters 230 from being exposed and provides a flat surface. The overcoat 250 may be omitted.

A common electrode 270 is formed on the overcoat 250. The common electrode 270 is preferably made of transparent conductive material such as ITO and IZO and has a plurality of sets of cutouts 71, 72, 73a, 73b, 74a and 74b.

A set of cutouts 71, 72, 73a, 73b, 74a and 74b face a pixel electrode 190 and include center cutouts 71 and 72, lower cutouts 73a and 74a, and upper cutouts 73b and 74b. Each of the cutouts 71-74b is disposed between adjacent cutouts 91-93b of the pixel electrode 190 or between a cutout 93a or 93b and a chamfered edge of the pixel electrode 190. In addition, each of the cutouts 71-74b has at least an oblique portion having a depressed notch 77 and extending parallel to the lower cutout 93a or the upper cutout 93b of the pixel electrode 190.

Each of the lower and the upper cutouts 73a-74b includes an oblique portion and a pair of transverse and longitudinal portions or a pair of longitudinal portions. The oblique portion extends approximately from a left edge, a lower edge, or an upper edge of the pixel electrode 190 approximately to a right edge of the pixel electrode 190. The transverse and longitudinal portions extend from respective ends of the oblique portion along edges of the pixel electrode 190, overlapping the edges of the pixel electrode 190, and making obtuse angles with the oblique portion.

Each of the center cutouts 71 and 72 includes a center portion, a pair of oblique portions, and a pair of terminal longitudinal portions. The center portion of the center cutout 71 extends in the transverse direction approximately from a center of the pixel electrode 190 along the storage electrode line 131. The center portion of the center cutout 72 extends in the longitudinal direction near the right edge of the pixel electrode 190. The oblique portions extend from an end or both ends of the center portion approximately to the left edge of the pixel electrode and making oblique angles with the central transverse portion. The terminal longitudinal portions extend from the ends of the respective oblique portions along the left edge of the pixel electrode 190, overlapping the left edge of the pixel electrode 190, and making obtuse angles with the respective oblique portions.

The number of the cutouts 71-74b may be varied depending on the design factors, and the light blocking member 220 may also overlap the cutouts 71-74b to block the light leakage through the cutouts 71-74b.

Alignment layers 11 and 21 that may be homeotropic are coated on inner surfaces of the panels 100 and 200.

Polarizers 12 and 22 are provided on outer surfaces of the panels 100 and 200 so that their polarization axes may be crossed and one of the polarization axes may be parallel to the gate lines 121. One of the polarizers 12 and 22 may be omitted when the LCD is a reflective LCD.

The LCD may further include at least one retardation film (not shown) for compensating the retardation of the LC layer 3. The LCD may further include a backlight unit (not shown) supplying light to the LC layer 3 through the polarizers 12 and 22, the retardation film, and the panels 100 and 200.

It is preferable that the LC layer 3 has negative dielectric anisotropy and it is subjected to a vertical alignment that the LC molecules in the LC layer 3 are aligned such that their long axes are substantially vertical to the surfaces of the panels 100 and 200 in absence of electric field. Accordingly, incident light cannot pass the crossed polarization system 12 and 22.

Upon application of the common voltage to the common electrode 270 and a data voltage to a pixel electrode 190, an electric field substantially perpendicular to the surfaces of the panels 100 and 200 is generated, and both the pixel electrode 190 and the common electrode 270 are commonly referred to as "field generating electrodes" hereinafter. The LC molecules tend to change their orientations in response to the electric field such that their long axes are perpendicular to the field direction.

The cutouts 71-74b and 91-93b of the field generating electrodes 190 and 270 and the edges of the pixel electrodes 190 distort the electric field to have a horizontal component that is substantially perpendicular to the edges of the cutouts 71-74b and 91-93b and the edges of the pixel electrodes 190.

Accordingly, the electric field points a direction oblique to a normal of a surface of the panels 100 and 200. The liquid crystal molecules tend to reorient themselves so that their long axes may be perpendicular to the electric field. Since the electric field near the cutouts 71-74b and 91-93b and the edges of the pixel electrode 190 is not parallel to the long axes of the LC molecules to make angles, the LC molecules rotate along a direction giving the shortest moving distance on a plane defined by the long axes of the LC molecules and the electric field.

Referring to FIG. 5, a set of the cutouts 71-74b and 91-93b divides a pixel electrode 190 into a plurality of sub-areas and each sub-area has two primary edges making oblique angles with the major edges of the pixel electrode 190. The primary edges of the sub-areas make an angle of about 45 degrees with the polarization axes of the polarizers 12 and 22 for maximizing the light efficiency.

Since most LC molecules on each sub-area tilt perpendicular to the primary edges, the azimuthal distribution of the tilt directions are localized to four directions, thereby increasing the reference viewing angle of the LCD.

The variation of the arrangement of the LC molecules changes the polarization of incident light and the change of the polarization is represented as the transmittance of the incident light by the polarizers 12 and 22.

The shapes and the arrangements of the cutouts 71-74b and 91-93b may be modified.

At least one of the cutouts 71-74b and 91-93b can be substituted with protrusions (not shown) or depressions (not shown). The protrusions are preferably made of organic or inorganic material and disposed on or under the field generating electrodes 190 or 270.

Figure 7:
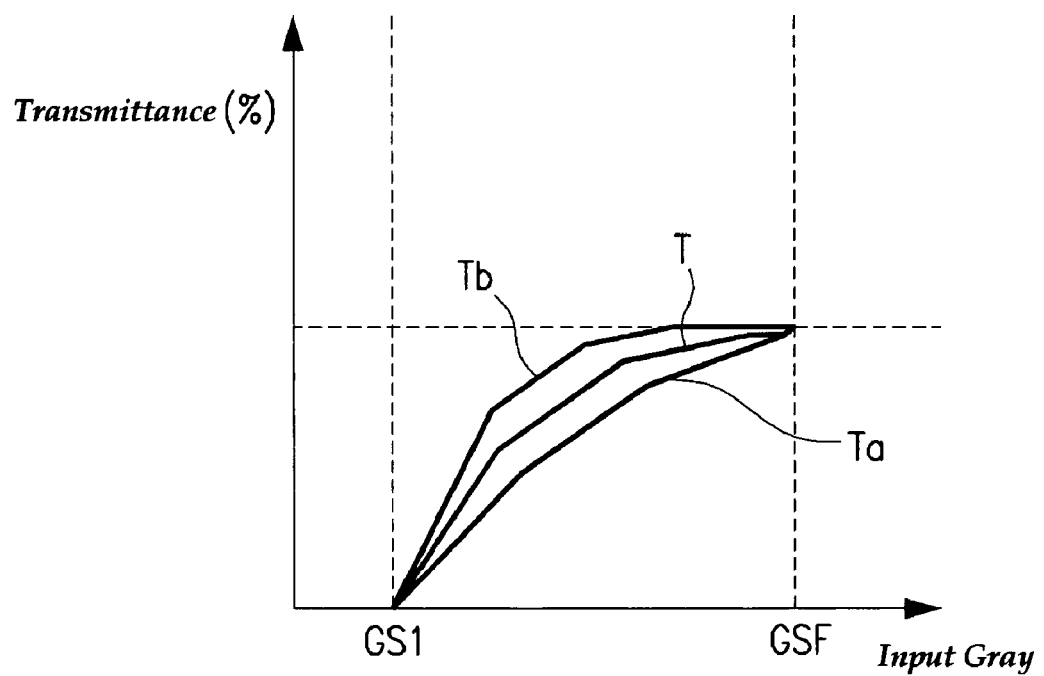
FIG. 7 is a graph illustrating gamma curves in an LCD according to an embodiment of the present invention.

Two different gamma curves Ta and Th as function of input gray GS1-GSF for the subpixels PXa and PXb are shown in FIG. 7. In FIG. 7, GS1 and GSf denote the lowest input gray and the highest input gray, respectively. The synthesis T of the two gamma curves Ta and Th form a gamma curve for a pixel PX. The voltages of the subpixels PXa and PXb are preferably determined such that the synthesized gamma curve T approaches a reference gamma curve at a front view. For example, the synthesized gamma curve at a front view coincides with the most suitable reference gamma curve at a front view, and the synthesized gamma curve T at a lateral view is the most similar to the reference gamma curve at a front view. For example, the lower gamma curve may be further lowered for improvement of the visibility.

In this way, the two subpixels PXa and PXb are separately controlled by using separate TFTs Qa and Qb according to separate gamma curves and thus the voltages of the two subpixels PXa and PXb can be exactly controlled to improve visibility, aperture ratio, and light transmittance.

The ratio of the areas of the first and the second subpixel electrodes 190a and 190b is firstly determined, and the first and the second subpixels PXa and PXb are designed based on the ratio of the capacitance between the first and the second LC capacitors Clca and Clcb that can be obtained from the ratio of the areas of the first and the second subpixel electrodes 190a and 190b.

In detail, the ratio of the capacitance between the first and the second storage capacitors Clca and Clcb and the ratio of the capacitance between first and second parasitic capacitors formed between gate and drain of the first and the second TFTs Qa and Qb.

It is assumed that the area of the gate electrodes of the first and the second TFTs Qa and Qb are the same and the channel length of the TFTs Qa and Qb is determined as a minimum value. Since the overlapping area of the gate electrode and the drain electrode increases as the channel width increases and vice versa, the capacitances of the first and the second parasitic capacitors can be controlled by varying the channel width of the first and the second TFTs Qa and Qb.

However, the channel length or both the channel length and the channel width may be varied for controlling the capacitances of the first and the second parasitic capacitors.

The voltage of a subpixel depends on the kickback voltage (Vk) that is determined by capacitances of the LC capacitor Clc, the storage capacitor Cst, and the parasitic capacitor Cgd as follows:

$$Vk = \frac{\Delta Vg \times Cgd}{Cst + Clc + Cgd}.$$

where $\Delta Vg$ is a difference in voltage levels of a gate signal.

When ratios of the capacitances of the first and the second storage capacitors and the first and the second parasitic capacitors are determined to be equal to the ratio of the first and the second liquid crystal capacitors, the kickback voltages for the first and the second subpixels can be equal to each other. In particular, the ratio of sum of the capacitances of the LC capacitor and the storage capacitor can be made equal to the ratio of the capacitance of the LC capacitors.

When the subpixels are designed to have substantially equal kickback voltages, the difference in the charging rate between the subpixels is decreased to improve the image quality.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display comprising:
   a pixel including a first subpixel and a second subpixel;
   a first gate line coupled to the first subpixel and transmitting a first gate signal;
   a second gate line coupled to the second subpixel and transmitting a second gate signal; and
   a data line intersecting the first and the second gate lines and transmitting a data voltage,
   wherein the first subpixel includes a first switching element connected to the first gate line and the data line, a first liquid crystal capacitor connected to the first switching element, and a first storage capacitor connected to the first switching element,
   the second subpixel includes a second switching element connected to the second gate line and the data line, a second liquid crystal capacitor connected to the second switching element, and a second storage capacitor connected to the second switching element,
   wherein the first liquid crystal capacitor has a first liquid crystal capacitance, the second liquid crystal capacitor has a second liquid crystal capacitance, and the first liquid crystal capacitance is different from the second liquid crystal capacitance, and
   wherein a ratio of a first parasitic capacitance associated with a first parasitic capacitor formed in the first switching element to a second parasitic capacitance associated with a second parasitic capacitor formed in the second switching element is equal to a ratio of the first liquid crystal capacitance to the second liquid crystal capacitance.

2. The liquid crystal display of claim 1, wherein each of the first and the second switching elements comprises a thin film transistor including a gate electrode connected to the first or the second gate line, a source electrode connected to the data line, and a drain electrode connected to the first or the second liquid crystal capacitor and the first or the second storage capacitor, and
   the first and the second parasitic capacitances are formed between the gate electrodes and the drain electrodes.

3. The liquid crystal display of claim 2, wherein the capacitances of the first and the second parasitic capacitances depend on a channel width or a channel length of the transistors.

4. The liquid crystal display of claim 1, wherein sizes of the first and the second switching elements are determined based on the ratio of the first liquid crystal capacitor and the second liquid crystal capacitor.

5. The liquid crystal display of claim 1, wherein the ratio of the capacitances between the first and the second parasitic capacitors and the ratio of capacitances between the first storage capacitor and a second storage capacitor are equal to the ratio of the first liquid crystal capacitor and the second liquid crystal capacitor.

6. The liquid crystal display of claim 5, further comprising a storage electrode line connected to the first and the second storage capacitors.

7. The liquid crystal display of claim 6, further comprising a shielding electrode overlapping the data line and electrically insulated from the data line.

8. The liquid crystal display of claim 1, wherein the first liquid crystal capacitor comprises a first subpixel electrode, and the second liquid crystal capacitor comprises a second subpixel electrode.

9. The liquid crystal display of claim 8, wherein the first and the second subpixel electrodes substantially have an inversion symmetry with respect to a straight line parallel to the first and the second gate lines.

10. The liquid crystal display of claim 9, wherein at least one of the first and the second subpixel electrodes has a cutout.

11. The liquid crystal display of claim 10, further comprising a common electrode facing the first and the second pixel electrodes.

12. The liquid crystal display of claim 11, wherein the common electrode has a cutout.

13. The liquid crystal display of claim 12, wherein the cutout of the at least one of the first and the second subpixel electrodes and the cutout of the common electrode are alternately arranged.

14. The liquid crystal display of claim 13, wherein a gap between the first subpixel electrode and the second subpixel electrode and the cutout of the common electrode are alternately arranged.

15. The liquid crystal display of claim 14, wherein the cutout of the common electrode has a notch.

16. The liquid crystal display of claim 8, further comprising a shielding electrode overlapping the data line and disposed on the same layer as the first and the second subpixel electrodes.

17. The liquid crystal display of claim 1, wherein a kickback voltage of the first subpixel is substantially equal to a kickback voltage of the second subpixel, the kickback voltage of the first subpixel being proportional to the first parasitic capacitance and being inversely proportional to a sum of the first parasitic capacitance, the first liquid crystal capacitance, and a capacitance of the first storage capacitor, the kickback voltage of the second subpixel being proportional to the second parasitic capacitance and being inversely proportional to a sum of the second parasitic capacitance, the second liquid crystal capacitance, and a capacitance of the second storage capacitor.

18. The liquid crystal display of claim 1, wherein a ratio of a capacitance of the first storage capacitor to a capacitance of the second storage capacitor is equal to the ratio of the first liquid crystal capacitance to the second liquid crystal capacitance.

* * * * *